Sept. 23, 1947. R. E. EGGERT 2,427,769

THREADLESS NUT

Filed Nov. 29, 1944

Inventor
Ronald E. Eggert
By R. S. Birry
Attorney

Patented Sept. 23, 1947

2,427,769

UNITED STATES PATENT OFFICE 2,427,769

THREADLESS NUT

Ronald Edgar Eggert, Burbank, Calif., assignor to Adel Precision Products Corp., a corporation of California Application November 29, 1944, Serial No. 565,715

3 Claims. (Cl. 85—36)

This invention relates to threadless fastenings for holding in place threadless studs and like threadless members.

An object of this invention is to provide a threadless nut of the character described which may be readily and inexpensively made from a strip or like piece of resilient metal and is constructed and arranged in a particular manner to securely grip and hold in place a threadless stud or like member and increasingly grip and bite into the stud responsive to forces tending to separate the nut and the stud.

Another object of this invention is to provide a nut such as described which will grip the stud or like member to which it is applied with a spring action in such manner as to prevent loosening thereof under vibration.

A further object of this invention is to provide a nut such as described in which an apertured base portion of the nut through which base portion the stud of like member may be extended, is provided with stud-gripping tongues, wings or members overlying the base and constructed and arranged to cause the base to be bowed outwardly between its ends when said tongues, wings or members are forced into position to securely grip the stud or like member, this outward bowing of the base portion causing the entire nut to be placed under tension such that the tongues, wings or members are spring-urged into biting and locking engagement with the stud and there is provided a space between the inner face of the base and the member from which the stud extends, whereby a tool may be readily inserted for prying against the base so that the tongues, wings or members will move apart and release the stud as well as the nut.

Another object of my invention is to provide a nut such as described in which the base portion may be pre-formed with an outward bow to increase the spring action of the nut as a whole, the base being bowed outwardly additionally upon the forcing of the tongues inwardly to tightly grip the stud, thereby increasing the spring action which urges the tongues against the stud.

With the foregoing objects in view, together with such other objects and advantages as may subsequently appear, the invention resides in the parts and in the combination, construction and arrangement of parts hereinafter described and claimed, and illustrated by way of example in the accompanying drawing, in which:

Referring to the accompanying drawing more specifically, it will be seen that a nut embodying the present invention may be made from a substantially rectangular strip or piece of resilient sheet metal which has its ends bent back to form two opposed tongues or wings 8 and a rectangular base or body portion 9. These tongues overlie the base portion so that their ends are spaced apart. Arcuate stud-engaging edge portions 10 are provided in the free ends of the tongues and overlie a stud-receiving opening 11 formed in the base portion 9.

Figure 5:
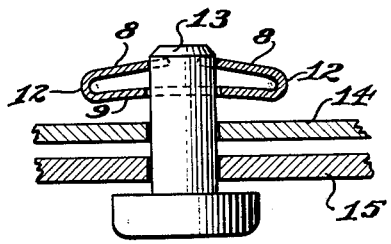
Fig. 5 is a sectional view showing the nut when first applied to a threadless stud and before being tightened thereon.

As here shown the tongues 8 are joined to the base 9 by curved bends 12 on radii equal to substantially twice the thickness of the sheet metal strip, and when unstressed are upwardly inclined toward their free ends which are so spaced apart that the arcuate stud-engaging edges 10 will closely engage and conform to a threadless stud or like member 13 and be slightly forced apart when the nut is applied thereto as shown in Fig. 5, the opening 11 on the contrary being of such larger diameter than the stud that the latter will pass freely therethrough.

Fig. 5 shows the nut as it would appear when applying it to the stud 13 when the latter is inserted through the members 14 and 15 which are to be secured by the stud and the nut, the nut being on the outer end of the stud and subject to being forced inwardly against the member 14 while the stud is likewise subject to being pushed inwardly so that its head will abut the other member 15. Upon initially applying the nut to the stud the tongues are forced apart somewhat thereby causing the base portion to be bowed outwardly as shown in Fig. 5 and increasing the resilient contact of the tongues with the stud.

Figure 1:
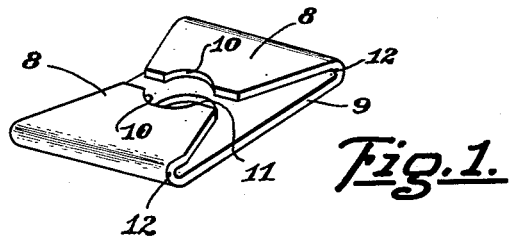
Fig. 1 is a perspective view of a nut embodying the present invention.
Figure 2:
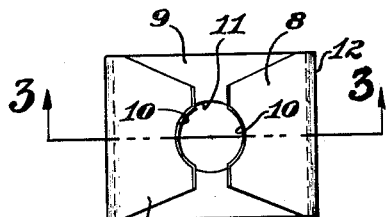
Fig. 2 is a top plan view of the nut.
Figure 4:
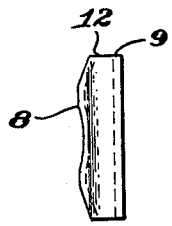
Fig. 4 is an end elevation of the nut.
Figure 3:
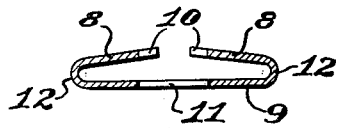
Fig. 3 is a cross sectional view taken on the line 3—3 of Fig. 2.
Figure 6:
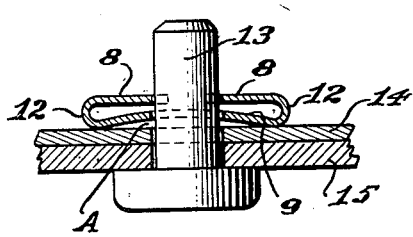
Fig. 6 is a sectional view corresponding to Fig. 5, showing the nut in tightened position on the stud.
Figure 7:
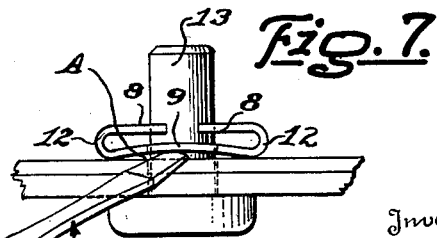
Fig. 7 is an elevation of the nut as shown in Fig. 6, showing how a tool may be inserted for loosening and removing the nut.

Figs. 6 and 7 show how the nut is forced home into final locking position. In forcing the nut into this position the tongues 8 are moved from their inclined positions shown in Figs. 2 and 5 into locking position lying in substantially parallelism with the base portion 9 as shown in Figs. 6 and 7. This forcing of the tongues into locking position exerts a force through the bends 12 such that the base 9 is bowed outwardly a greater extent as shown in Figs. 6 and 7, whereby the resilient action of the base is effective as well as the spring action of the tongues to assure a tight gripping of the edge portions 10 with the stud. Moreover, this outward bowing of the base 9 provides a space as shown at A (Figs. 6 and 7) between the base and the member 14, thereby permitting of the insertion of a suitable tool B which, as shown in Fig. 7, may be manipulated to flex or bow the base further outwardly so that the edges 10 will be sprung apart and release the stud, and the nut may be readily forced off the stud or the stud pulled out from the nut.

In the use of the nut it may be forced onto the stud or the stud forced through the nut and pressure then applied to move the nut home and to force the opposed tongues into the final locking position substantially parallel with the base 9 as shown in Figs. 6 and 7. When the tongues are brought to substantially parallelism with the base 9 they tend to distort the nut structure as a whole but this force causes the base to bow outwardly as shown in Figs. 6 and 7 and the resilient action of the base is added, to cause the tongues to bite into the stud and hold it with a wedging action, thereby locking the nut and stud against being loosened. Any forces tending to force the nut and stud apart, except when the tool B is applied to remove the nut as aforesaid, will cause the arcuate stud-engaging edges 10 to bite deeper into the stud thereby effectively resisting separation of the stud and nut.

The large opening 11 in the base 9 allows free movement of the base relative to the stud in applying and removing the nut and when the base is bowed outward as the tongues 8 are forced inwardly to lock the nut on the stud. In this connection it should be noted that the end portions of the base 9 are forced inwardly against the member 14 upon the pushing of the tongues inwardly into the locking position thereof shown in Figs. 6 and 7, and, as these end portions are forced inwardly, the portion of the base between said ends will buckle or bow outward as hereinbefore noted. Due to this behavior of the nut, the entire nut is under a spring tension tending to tighten the grip of the arcuate stud-engaging edge portions 10, wherefore the nut is locked on the stud in a reliable manner and will effectively resist vibration.

As here shown the tongues may be reduced in width or tapered toward their outer ends to increase the flexibility thereof.

Figure 8:
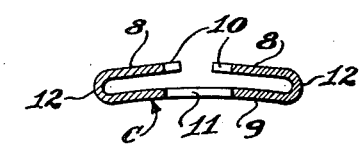
Fig. 8 is a sectional view of a modified form of my invention.

In Fig. 8 there is shown a modified form of my invention in which a nut in all respects is the same as that shown in Figs. 1 to 7 inclusive except that the base portion 9 is pre-formed with an outward bow as at C. This pre-formation increases the spring action which forces the edges 10 against the stud inasmuch as the base is bowed outwardly a greater extent upon being initially applied to the stud as shown in Fig. 5 and again bowed outwardly a greater extent when the tongues 8 are forced inwardly to substantially the locking position shown in Fig. 6.

It should be noted that the nut and stud are effectively held together under compression due to the distortion and reaction of the tongues and base of the nut caused in forcing the tongues inwardly into the locking position shown in Fig. 6. With the parts in position shown in Fig. 6, a secure holding of the stud in place is assured. Moreover, the nut exerts a spring force axially of the stud such that the parts 14 and 15 secured by the nut and stud are compressed and yieldingly held together.

It should be noted that the base portion is weakened by the formation of the relatively large stud-receiving opening therein, thereby forming a flexure point on a line which bisects said opening and extends across said base. Due to the provision of this flexure point and the sharp bends at 12 where the tongues 8 are joined to the base, also the comparative stiffness of the spring metal of which the nut is formed, the tongues 8 when forced inwardly on the stud will be spread apart and exert such forces through the sharp bends that the base will bow outwardly at said flexure point and thus set up the resilient force which securely locks the nut on the stud. In other words, the maximum flexure is at the flexure point across the base at the stud-receiving opening since the sharp bends themselves flex or bend but a relatively small extent when the tongues are forced apart while being pressed inwardly on the stud.

While I have shown and described specific embodiments of my invention I do not limit myself to the exact details of construction set forth, and the invention embraces such changes, modifications and equivalents of the parts and their formation and arrangement as come within the purview of the appended claims.

I claim:

1. In a threadless nut for holding a threadless stud or the like in place, an elongated strip of resilient sheet metal having its end portions bent back to provide opposed tongues and a body portion with the tongues overlying the body portion so that their ends are spaced apart, said tongues having stud engaging edges at their outer ends and being inclined outwardly from the body portion to said edges, said body portion having a stud-receiving opening formed therein so as to define a flexure point in said body portion, the tongues and body portion being constructed and arranged so that upon forcing the tongues inwardly toward the body portion the latter will flex at said flexure point and bow outwardly whereby said edges are forced against the stud under the spring action of said body portion and said tongues.

2. In a threadless nut for holding a threadless stud, a substantially flat sheet metal base portion having a stud-receiving opening substantially centrally thereof dimensioned to permit of free movement of the base portion relative to the stud to which the base is applied, and resilient tongues joined to opposite extremities of said base portion by means of sharp bends and extending over said base portion with their free ends spaced apart for contact with the stud, said opening defining a flexure point across the stud, said bends and tongues being so constructed and arranged that upon pushing the tongues against the stud and inwardly toward the base portion, the base will flex at said flexure point and bow outwardly toward said tongues.

3. In a threadless nut for threadless studs, a sheet metal base portion having an aperture therethrough, said aperture being larger than the stud element to be engaged by said nut and so located relative to the edges of said base portion as to determine a point of flexure therein; said base portion having a pair of end portions provided with relatively sharp return bends and terminating above said aperture, said ends defining an opening of lesser diameter than the stud element to be engaged by said nut and operative when said nut is applied to a stud to effect a flexure of said base portion at said point; the resilience of said base portion operating to maintain said end portions in gripping engagement with the stud and cooperating with said flexure to yieldingly oppose movement axially of said stud.

RONALD EDGAR EGGERT.

REFERENCES CITED

The following references are of record in the file of this patent:

UNITED STATES PATENTS

| Number | Name | Date |
|---|---|---|
| 593,221 | Howell et al. | Nov. 9, 1897 |
| 1,243,859 | Neider | Oct. 23, 1917 |
| 2,236,929 | Tinnerman | Apr. 1, 1941 |
| 492,715 | Dempsey | Feb. 28, 1893 |